(12) United States Patent
Yang et al.

(10) Patent No.: US 12,089,514 B2
(45) Date of Patent: Sep. 17, 2024

(54) GRAPEVINE SOIL-CLEANING DEVICE AND ENGINEERING MACHINERY PROVIDED INSTALLED WITH SOIL-CLEANING DEVICE

(71) Applicant: Jiangsu University, Jiangsu (CN)

(72) Inventors: Qizhi Yang, Jiangsu (CN); Guangyu Du, Jiangsu (CN); Aiping Shi, Jiangsu (CN); Jing Zhang, Jiangsu (CN); Guanlong Huang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 1025 days.

(21) Appl. No.: 17/042,688

(22) PCT Filed: Mar. 6, 2019

(86) PCT No.: PCT/CN2019/077065
§ 371 (c)(1),
(2) Date: Sep. 28, 2020

(87) PCT Pub. No.: WO2020/168593
PCT Pub. Date: Aug. 27, 2020

(65) Prior Publication Data
US 2021/0120723 A1   Apr. 29, 2021

(30) Foreign Application Priority Data

Feb. 18, 2019   (CN) .......................... 201910119132.9

(51) Int. Cl.
*A01B 39/16* (2006.01)
*A01B 39/22* (2006.01)
(Continued)

(52) U.S. Cl.
CPC .............. *A01B 39/16* (2013.01); *A01B 39/22* (2013.01); *A01B 39/28* (2013.01); *E02F 3/9206* (2013.01)

(58) Field of Classification Search
CPC ........ E02F 3/9206; A01B 39/16; A01B 39/22; A01B 39/28
See application file for complete search history.

(56) References Cited

U.S. PATENT DOCUMENTS 3,342,198 A * 9/1967 Groeber .................... F15C 1/04
                                                         137/829
4,709,860 A * 12/1987 Patrick .................. A01M 9/003
                                                         239/336
(Continued)

FOREIGN PATENT DOCUMENTS

CN        202652832 U    1/2013
CN        203446180 U    2/2014
(Continued)

*Primary Examiner* — Jessica H Lutz
(74) *Attorney, Agent, or Firm* — SALIWANCHIK, LLOYD & EISENSCHENK

(57) ABSTRACT

A grapevine soil-cleaning device and engineering machinery installed with the soil-cleaning device, comprising an air blower (4), an air vent direction reversal device, a soil-retaining device, an angular sensor (7) and a controller (19). The controller (19) is connected to the air blower (4), the angular sensor (7), the air vent direction reversal device and the soil-retaining device respectively. The present device achieves non-contact soil cleaning by blowing air, and has the advantages of no harmful impact on buds and branches, one-time cleaning, and highly efficient soil cleaning. The air vent direction reversal device may achieve a consistent air-blowing direction when the grapevine soil-cleaning device moves among rows of the grapevine. The soil-retaining device may hold back the blown soil and reduce the displacement distance of the blown soil. An auxiliary air (Continued)

pipe is provided below a main air pipe to assist soil-cleaning operations and avoid generating pits on a ridge due to concentrated wind power of the main air pipe. The air vent direction reversal, adjustment of the air power of the air blower and automated direction reversal of the soil-retaining device when moving among ridges are achieved by using the angular sensor (7) and the controller (19), thus achieving a high level of technological intelligence.

5 Claims, 2 Drawing Sheets

(51) Int. Cl.
*A01B 39/28* (2006.01)
*E02F 3/92* (2006.01)

(56) References Cited

U.S. PATENT DOCUMENTS

| | | | | |
|---|---|---|---|---|
| 4,779,765 | A * | 10/1988 | Neumeyer | A01C 7/06 111/178 |
| 4,872,785 | A * | 10/1989 | Schrage | A01C 7/081 406/41 |
| 10,537,054 | B2 * | 1/2020 | Roberge | B05B 7/1477 |
| 2014/0158033 | A1 * | 6/2014 | Jagow | A01C 7/20 406/108 |

FOREIGN PATENT DOCUMENTS

| | | |
|---|---|---|
| CN | 106034418 A | 10/2016 |
| CN | 206948826 U | 2/2018 |
| JP | S57202202 A | 12/1982 |

* cited by examiner

GRAPEVINE SOIL-CLEANING DEVICE AND ENGINEERING MACHINERY PROVIDED INSTALLED WITH SOIL-CLEANING DEVICE

CROSS REFERENCE TO RELATED APPLICATIONS

This application is a National Stage Application of International Application Number PCT/CN2019/077065, filed Mar. 6, 2019; which claims priority to Chinese Application No. 201910119132.9, filed Feb. 18, 2019.

TECHNICAL FIELD

The present invention belongs to the research field of agricultural machinery. Specifically, the present invention relates to a grapevine covering soil clearing device and a construction machine for installing the soil clearing device.

BACKGROUND ART

In Ningxia region of China, in order to prevent grapevines from drying and frosting in the winter, the more common grape overwintering method currently adopted is mainly burying grapevine, i.e. covering the grapevines with soil before winter comes. The grapevines will germinate when it reaches a certain temperature and humidity in the spring. If the vine-digging work is not completed before the germination of the grapes, the grapevines will germinate in the soil, thus the vine will be hurt when dug out from the soil and the production will decrease. Therefore, the grapevine digging is a very time-sensitive job. The planting area of vineyards in Ningxia is relatively large. In the past, the work of grapevine-digging was mainly done by manpower. This not only consumes a lot of manpower, but also has poor efficiency. The existing grapevine digging machines in Ningxia can only remove the covering soil from left and right sides or above. For example, the patent application No. CN201610514105 discloses an automatic soil removing machine for grapevines. This soil removing machine removes soil from the side by using a soil removal plow and a moldboard. And the patent application No. CN201720589411 discloses an automatic avoidance omnidirectional soil removing machine for grapevines. This soil removing machine can scrape the covering soil between the piles and the sides of the grapevines with a pile-between scraper and a side scraper. However, the machines in the above disclosed patent applications cannot realize soil clearing of the central area around the grapevine.

Content of the Invention

In view of the above problems, the present invention provides a grapevine soil clearing device. This device utilizes the wind from the fan for non-contact clearing, and realizes the soil clearing of the central area around the grapevine. In order to achieve continuous operation, it is necessary to ensure that the grapevine soil clearing device performs soil clearing for each row in turn, so that the direction of wind blowing should remain the same after the device moves from one ridge to another, that is, the direction of air outlets should be turned 180. To this end, the grapevine soil clearing device adopts a structure with double air outlets on both sides and a built-in air outlet reversing device for quick reversing of wind direction, so that it is not necessary to design a steering mechanism for the entire fan. Therefore, a high-power fan with relatively large volume and mass can be selected to improve the efficiency of soil clearing. Double air outlets are designed on one side of the auxiliary air ducts under the main air ducts. This can avoid generating pits by the concentration of wind from a single air outlet and improve the performance of soil clearing. The whole machine in the present invention has small volume and mass, and can use a large-power fan with relatively large volume and mass. The machine can use the angle sensor and the controller to realize the automation of the air outlets reversing, the fan power adjustment and the reversing of the soil retaining device. This machine simplifies the air outlet steering mechanism and does not require manual operation with high intelligence. Moreover, the soil clearing using wind force not only achieves non-contact soil clearing of the central area around the grapevines, does not hurt the grapevines and buds, but also is highly efficient.

The present invention also provides a construction machine for installing the grapevine soil clearing device.

The technical solution of the present invention is: a grapevine soil clearing device, includes:

a fan, and an air outlet reversing device, wherein the air outlet reversing device is connected to the outlet of the fan, a main air duct is respectively disposed on both sides, and the air outlet reversing device is used to transform the main air duct connected with the fan and the air outlets.

In the above solution, the air outlet reversing device comprises:

an air outlet commutator, which is connected to the outlet of the fan, and is provided with main ducts respectively on both sides;

a baffle, which is located in the air outlet commutator;

and a first driving mechanism, the output shaft of the first driving mechanism is connected to the baffle, and the first driving mechanism drives the baffle to rotate, thereby transforming the main air duct connected with the fan.

The above-mentioned solution further comprises a soil retaining device, and the soil retaining device is located directly in front of the outlet of the main air duct.

Further, the soil retaining device includes a retaining plate support, a retaining plate and a second driving mechanism.

One end of the retaining plate support is connected with the retaining plate, the other end is connected with the output shaft of the second driving mechanism, and the second driving mechanism drives the retaining plate to change the position and direction.

The above-mentioned solution further comprises, an angle sensor, which is used for collecting steering signals;

and a controller, which is respectively connected with the fan, the angle sensor, the first driving mechanism and the second driving mechanism.

In the above-mentioned solution, two sides of the air outlet reversing device are also provided with auxiliary air ducts;

The air outlet of the auxiliary air duct is located below the air outlet of the main air duct.

The above-mentioned solution further comprises a rack, and the fan, the air outlet reversing device and the soil retaining device are respectively installed on the rack.

Further, ground contour wheels are respectively installed on both sides of the rack.

In the above-mentioned solution, the connecting rod of the ground contour wheels is connected to the rack by height adjusting mechanisms.

A construction machine, including the grapevine soil clearing device.

Compared with the prior art, the beneficial effects of the present invention are:

1. The present invention realizes non-contact soil clearing by wind blowing, does not contact with soil and vines, does not hurt buds and branches, and clears the soil for one time.

2. In order to achieve the consistency of the wind blowing direction after changing the ridge, the present invention adopts a structure with double air outlets on both sides, and a built-in air outlet reversing device to achieve rapid adjustment of the outlets steering without the need of designing a steering adjustment mechanism for the entire fan. Therefore, a high-power fan with relatively large volume and mass can be selected to improve the efficiency of covering soil clearing.

3. The retaining device of the present invention can block the blown soil and reduce the dispersion distance of the soil blown by the fan.

4. In the present invention, double air outlets on one side of the auxiliary air duct are designed under the main air outlet. These are used to assist the soil clearing operation and avoid the concentration of wind power from the main air duct on the ridge to generate pits and lower the performance of soil clearing.

5. In the present invention, the angle sensor and the controller are used to realize the automation of the air outlet reversing, the wind adjustment of the fan and the reversing of the soil retaining device when the ridge is changed, the mechanism is simplified and does not require manpower. In addition, the degree of intelligence is relatively high.

6. The height of the ground contour wheel of the present invention can be adjusted to adapt to the soil ridges of different heights.

7. The invention has simple structure and relatively small mass. Not only can it be installed by the hydraulic lifter on the tractor and operated alone, but also can be integrated on the mechanical digger to achieve soil clearing of the central area around the vine.

8. The present invention can be equipped with fans of different power and power sources according to different requirements.

BRIEF DESCRIPTION OF DRAWINGS

The above and/or additional aspects and advantages of the present invention will become apparent and readily understood with the description of the examples combined with the drawings below.

Figure 1:
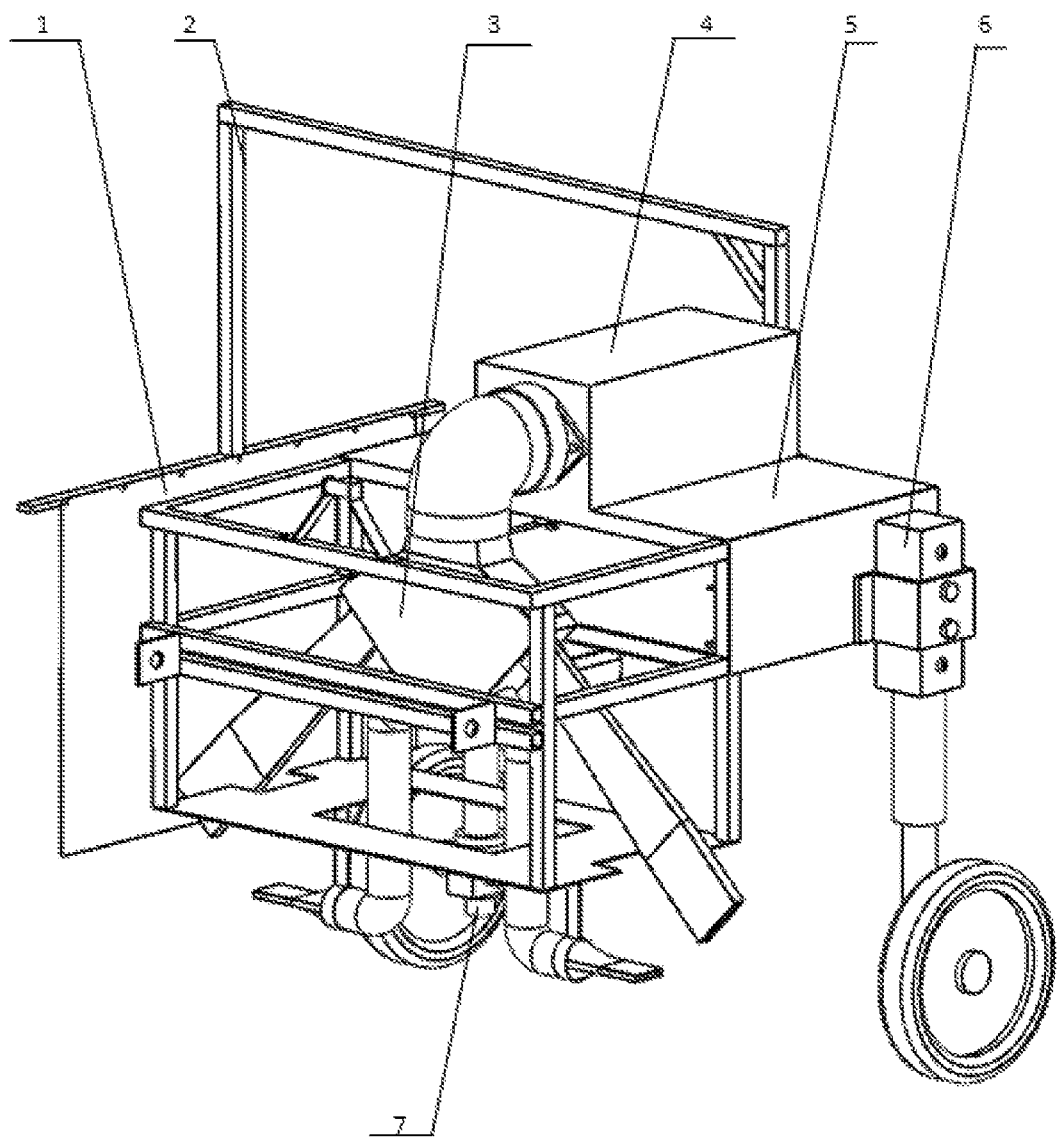
FIG. 1 is a structural schematic diagram of an embodiment of the present invention.
Figure 2:
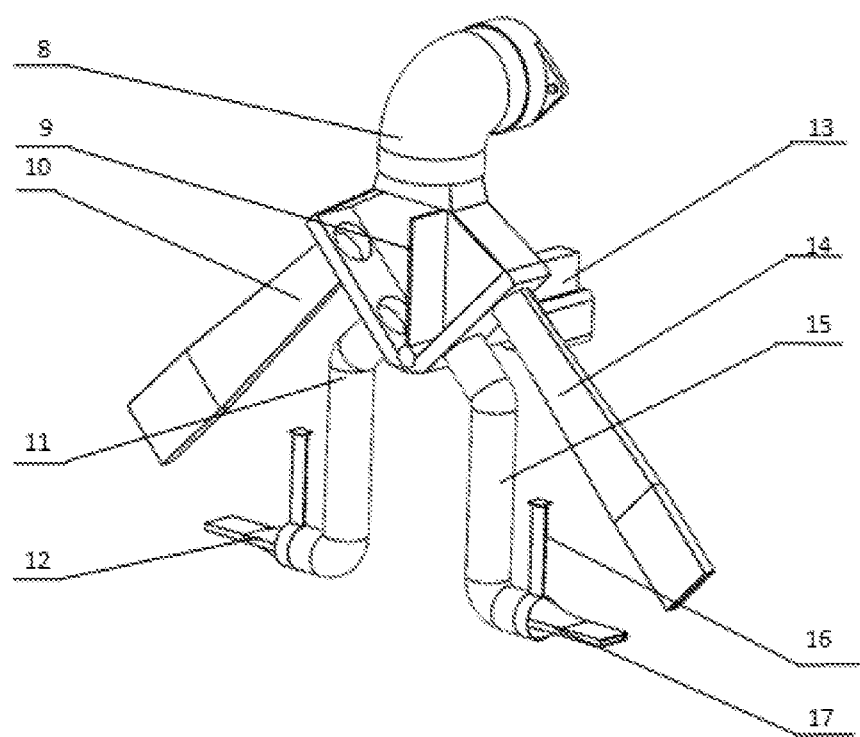
FIG. 2 is a structural schematic diagram of the air outlets reversing device according to an embodiment of the present invention.
Figure 3:
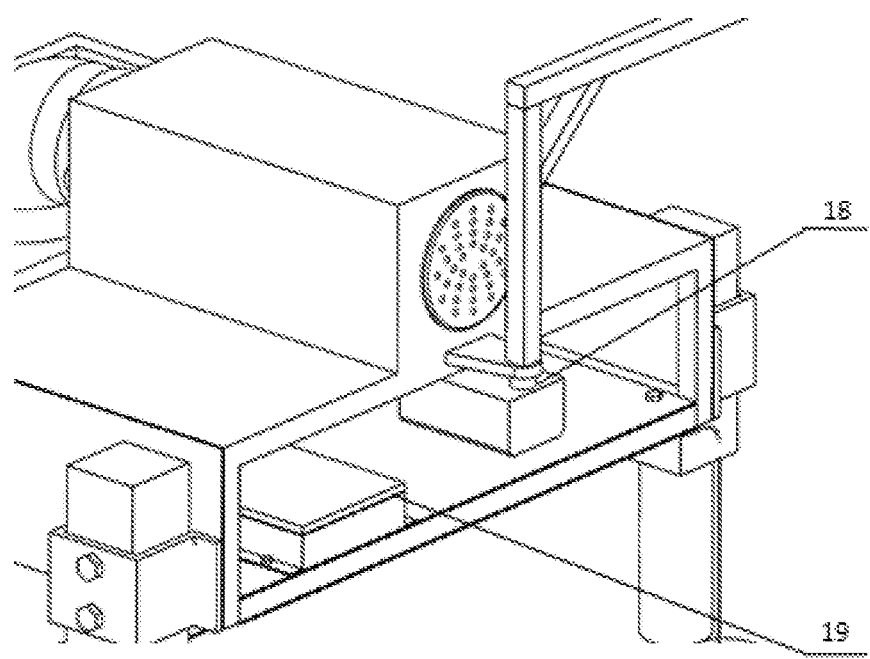
FIG. 3 is a schematic diagram of the posterior structure of the rack according to an embodiment of the present invention.

In the drawings: 1-retaining plate, 2-retaining plate support, 3-air outlets commutator, 4-fan, 5-rack, 6-ground contouring wheel, 7-angle sensor, 8-fan duct, 9-baffle, 10-first main air duct, 11-first hose, 12-first auxiliary air duct, 13-first steering gear, 14-second main air duct, 15-second hose, 16-auxiliary air duct bracket, 17-second auxiliary air duct, 18-second steering gear, 19-controller.

DETAILED EMBODIMENTS

The embodiments of the present invention are described in detail below, and examples of the embodiments are shown in the drawings, wherein the same or similar reference numerals are used to refer to the same or similar elements or elements having the same or similar functions. The embodiments described below with reference to the drawings are intended to be illustrative of the invention and are not to be construed as limiting to the present invention.

In the description of the present invention, it should be appreciated that terms indicating the orientation or positional relationship such as "center", "longitudinal", "transverse", "length", "width", "thickness", "upper", "lower", "axial", "radial", "vertical", "horizontal", "inside", "outside", and etc., are based on the orientation or positional relationship shown in the drawings. The above terms are only used to facilitate the description of the present invention and to simplify the description, and are not intended to indicate or imply that the device or elements referred to have a particular orientation, are constructed and operated in a particular orientation, thus these descriptions are not to be construed as limiting to the present invention. Moreover, the terms "first" and "second" are used for descriptive purposes only and are not to be construed as indicating or implying a relative importance or implicitly indicating the number of technical features indicated. Thus, features defining "first" and "second" may include one or more of the features either explicitly or implicitly. In the description of the present invention, the meaning of "a plurality" is two or more, unless specifically defined otherwise.

In the present invention, terms such as "installation," "connected," "coupled," and "fixed" should be understood broadly, unless explicitly stated and limited. For example, it may be a fixed connection, a detachable connection, or an integral connection; it can be a mechanical connection, or an electrical connection; it can be directly connected or indirectly connected through an intermediate medium, which can be the internal connection between two components. For those skilled in the art, the specific meanings of the above terms in the present invention can be understood on a case-by-case basis.

Embodiment 1

FIG. 1 shows an embodiment of the grapevine covering soil clearing device according to the present invention. The grapevine covering soil clearing device includes a fan 4 and an air outlet reversing device. The air outlet reversing device is connected to the outlet of the fan 4, and is provided with main air ducts on both sides respectively.

Preferably, the air outlet reversing device includes an air outlet commutator 3, a baffle 9, and a first driving mechanism. The air inlet of the air outlets commutator 3 is connected to the outlet of the fan 4 through a fan duct 8, and a first main duct 10 and a second main duct 14 are respectively arranged at the air outlets on both sides. The baffle 9 is located in the air outlet commutator 3. The output shaft of the first driving mechanism is connected to the baffle 9, and the first driving mechanism drives the baffle 9 to rotate, in order to change the main air duct connected with the fan 4. Specifically, the first driving mechanism is the first steering gear 13, and the rotating shaft of the baffle 9 is coupled to the first steering gear 13 through the hole of the air outlet commutator 3.

Preferably, the grapevine covering soil clearing device further includes a soil retaining device, the soil retaining device is located directly in front of the outlet of the main air duct.

Specifically, the soil retaining device includes a soil retaining plate support 2, a soil retaining plate 1 and a second driving mechanism. One end of the retaining plate support 2 is connected to the retaining plate 1 and the other end is connected to the output shaft of the second driving mechanism, and the second driving mechanism drives the retaining plate 1 to change the position and direction. Preferably, the second driving mechanism is the second steering gear 18.

Preferably, the grapevine covering soil clearing device further includes an angle sensor 7 and a controller 19, and the angle sensor 7 is configured to collect the steering signal. The controller 19 is connected to the fan 4, the angle sensor 7, the first driving mechanism and the second driving mechanism, respectively. The air outlet reversing device can obtain the steering signal of the grapevine covering soil clearing device through the angle sensor 7. The controller 19 controls the first steering gear 13 to rotate forward or reverse, and drives the baffle 9 to block the air outlet on the side of the air outlet commutator, so that the automatic reversing of air outlet can be achieved while changing the ridge. When the grapevine covering soil clearing device starts to change the ridge and turns around, it can obtain the steering signal via the angle sensor 7, and the wind power of the fan 4 decreases under the control of the controller 19, after the ridge changing is finished, the wind power of the fan 4 is controlled to increase again. This efficiently prevents the soil nearby being blown and dispersing while changing the ridge. The soil retaining device can reduce the dispersion distance of the soil blown up by the fan, and the retaining device can obtain the steering signal of the grapevine covering soil clearing device via the angle sensor 7. The controller 19 controls the second steering gear to rotate forward or reverse, and drives the retaining plate support to rotate, therefore, the retaining plate is automatically reversed while changing the ridge to keep it consistent with the direction of the soil clearing operation.

Preferably, auxiliary air ducts are respectively provided at the lower air outlets on both sides of the air outlet commutator 3, which are respectively a first auxiliary air duct 12 and a second auxiliary air duct 17. The air outlets of the auxiliary air ducts are located below the air outlets of the main air ducts. The axes of the first auxiliary air duct 12 and the second auxiliary air duct 17 point horizontally to the left and right sides of the rack 5, and are connected to the lower air outlets on both sides of the air outlets commutator 3 through the first hose 11 and the second hose 15 respectively. The main air ducts are used for soil clearing operations, and the auxiliary air ducts are used for auxiliary soil clearing operations from the horizontal direction to avoid pit generation due to the concentration of wind power transmitted by the main air ducts.

Preferably, the grapevine covering soil clearing device further includes a rack 5. The fan 4, the air outlet reversing device and the soil retaining device are respectively installed on the rack 5. Specifically, the rear part of the rack 5 is divided into an upper platform and a lower platform, and the fan 4 is fixedly installed on the upper platform of the rack 5. The rack 5 has a relatively large upper platform, on which high-power fans with relatively large volume and mass can be installed, and the fan 4 is fixed, which can effectively reduce the vibration. The controller 19 is fixedly installed on the lower platform of the rack 5. The rear part of the air outlet commutator 3 is fixed on the rack 5. The first steering gear 13 is fixedly installed below the lower platform of the rack 5, and the first auxiliary air duct 12 and the second auxiliary air duct 17 are respectively fixed on the bottom plate of the rack 5 through the auxiliary air duct bracket 16. The retaining plate support 2 is installed at the rear part of the rack 5, and the second steering gear 18 is fixedly installed below the upper platform of the rack 5.

Preferably, the ground contouring wheels 6 are respectively installed on two sides of the rack 5. The connecting rod of the ground contouring wheels 6 is connected to the rack 5 through a height adjustment mechanism. Specifically, the height adjustment mechanism includes a plurality of through holes provided along the longitudinal direction on the connecting rod of the ground contouring wheels 6. Π-shaped steels are welded on both sides of the rack 5 respectively. Bolts are used to pass through the Π-shaped steels, the connecting rods, and the corresponding positioning installation holes on the side of the rack, respectively, to fix the ground contouring wheels 6 on both sides of the rack.

The working principle of the invention:

A suspension arm is welded at the front end of the rack 5 of the grapevine covering soil clearing device. The suspension arm can be used to install the whole machine on the hydraulic lifter at the rear of a tractor, the suspension arm is lifted during the transfer process and lowered down during the operation of the soil clearing device. The fan 4 can be an electric fan or a gasoline fan. It should be noted that when using an electric fan, an additional small generator is required to supply power to the wind-blown grapevine covering soil clearing device. The small generator can be installed on the upper platform of the rack 5 or on the tractor, as appropriate. When using a gasoline fan, the tractor battery powers the steering gear and controller of the grapevine covering soil clearing device. A pair of ground contouring wheels 6 are fixedly installed on both sides of the rack 5 with bolts, and an angle sensor 7 is fixedly installed under the longitudinal axis of one of the ground contouring wheels 6 on one side. The angle sensor 7 is connected to the controller 19.

The flange end of the fan duct 8 is sleeved on the air outlet of the fan 4 and fixed to the fan 4 with bolts. The other end of the fan duct 8 is sleeved on the air inlet above the air outlet commutator 3. The interior of two ends of the fan duct 8 connected to the air outlet of the fan 4 and the air inlet of the air outlet commutator 3 are respectively provided with sealing rings. The air outlet commutator 3, the baffle 9 and the first steering gear 13 constitute the air outlet reversing device, wherein the first steering gear 13 is fixedly installed below the lower platform of the rack 5. The first steering gear 13 is connected to the controller 19. The rotating shaft of the baffle 9 is connected to the first steering gear 13 through the hole of the air outlet commutator 3, and each side of the baffle 9 that contacts the inner wall of the air outlet commuter 3 has a gasket. The front cover of the air outlet commutator 3 is fixed on the main body, and the rear part of the air outlet commutator 3 is fixed in front of the platform of the rack 5. The first main air duct 10 and the second main air duct 14 are used for soil clearing operations, and are installed at the upper air outlets on both sides of the air outlet commutator 3. Preferably, the axes of the first main air duct 10 and the second main air duct 4 is at an angle of 40° with the ground, in this case the soil clearing performance is good. The first auxiliary air duct 12 and the second auxiliary air duct 17 are used to assist in soil clearing operations, and to avoid the concentration of wind power of the main air duct in the ridge to generate pits, which affects the soil clearing performance negatively. Preferably, the axes of the first auxiliary air duct 12 and the second auxiliary air duct 17 point horizontally to the left and right sides of the rack 5 and are respectively connected to the lower air outlets on both sides of the air outlet commutator 3 through hoses. The clamps of the auxiliary duct bracket 16 are sleeved on the first auxiliary air duct 12 and the second auxiliary air duct 17, respectively, the upper side is fixed to the bottom plate of the rack 5 with bolts. All parts are installed in close cooperation, and the joints of non-moving parts can be sealed with sealant.

The retaining plate support 2, the retaining plate 1 and the second steering gear 18 constitute the soil retaining device. The second steering gear 18 is fixedly installed below the upper platform of the rack 5, and the second steering gear 18 is connected to the controller 19. The shaft at the bottom of the proximal end of the retaining plate support 2 passes through the positioning hole at the rear of the rack 5 and is connected to the second steering gear 18. The retaining plate support 2 crosses the top of the grapevine. The retaining plate 1 is made of plastic and is bolted to the beam at the far end of the retaining plate support 2 to ensure the retaining effect and reduce weight. The soil retaining device can block the soil being blown up and reduce the dispersion distance of the soil blown up by the fan.

The grapevine covering soil clearing device uses wind blowing to clear the covering soil while digging the grapevine. By using the angle sensor 7, steering signals can be collected and by controlling the air outlet reversing device, the fan and the soil retaining device through the controller 19, the air outlet reversing, the fan power adjustment and the reversing of the soil retaining device can be automated during the ridge changing. This can ensure that all the ridges are cleared in the same direction, and that the direction of the retaining plate 1 is the same as that of the soil clearing operation.

The method for clearing soil by the grapevine covering soil clearing device specifically includes the following steps:

Initially, the direction of the working air outlets is the same as the direction of the retaining plate 1. When the steering angle collected by the angle sensor 7 is greater than a certain value θ, the controller 19 controls the first steering gear 13 and the second steering gear 18 to rotate. The first steering gear 13 rotates and drives the baffle 9 to block the air outlet on one side of the air outlet commutator 3 and stop at this position to realize the air outlet reversal. The second steering gear 18 drives the retaining plate support 2 to rotate, so that the retaining plate 1 is located in the same direction as the covering soil clearing operation direction, and stops at this position. At the same time, the controller 19 controls the fan 4 to reduce the wind force to avoid blowing the surrounding soil during the steering process. As the ridge changing is about to be completed, when the steering angle collected by the angle sensor 7 is less than a certain value θ, the controller 19 controls the fan 4 to increase the wind force and continue the covering soil clearing operation. When the ridge is changed next time, the controller 19 controls the first steering gear 13 and the second steering gear 18 to rotate in opposite directions, so that all the ridges are cleared in the same direction, and the retaining plate 1 is in the same direction as that of the covering soil clearing operation.

Embodiment 2

A construction machine includes the grapevine covering soil clearing device described in Embodiment 1, so the beneficial effects of Embodiment 1 are not described here in detail.

It should be understood that although the specification is described in accordance with each embodiment, not each embodiment contains only one independent technical solution. This description of the specification is only for clarity, and those skilled in the art should take the specification as a whole. The technical solutions in each embodiment can also be appropriately combined to form other implementations that can be understood by those skilled in the art.

The series of detailed descriptions listed above are only specific descriptions of the feasible examples of the present invention. They are not intended to limit the scope of protection of the present invention. Any equivalent embodiments or modifications made without departing from the technical spirit of the present invention shall be included in the protection scope of the present invention.

The invention claimed is:

1. A grapevine covering soil clearing device comprising a fan;
an air outlet reversing device, wherein, the air outlet reversing device is connected to air outlets of the fan, and main air ducts are provided on both sides, the air outlets reversing device is used for transforming the main air ducts connected to the air outlets of the fan,
wherein the air outlets reversing device comprises an air outlets commutator, a baffle and a first driving mechanism, wherein, the air outlets commutator is connected with the outlets of the fan, and the main air ducts are provided on both sides; the baffle is located in the air outlet commutator;
the output shaft of the first driving mechanism is connected with the baffle, and the first driving mechanism drives the baffle to rotate to change the main air ducts connected with the fan; auxiliary air ducts are further provided on both sides of the air outlet reversing device; the air outlets of the auxiliary air ducts are located below the air outlets of the main air ducts; further comprising a soil retaining device located directly in front of the main air ducts outlet; the soil retaining device comprises a retaining plate support, a retaining plate, and a second driving mechanism; one end of the retaining plate support is connected to the retaining plate, and the other end is connected to the output shaft of the second driving mechanism, and the second driving mechanism drives the retaining plate to change the position and direction; an angle sensor, wherein the angle sensor is used for collecting steering signals;
and a controller, the controller is respectively connected to the fan, the angle sensor, the first driving mechanism and the second driving mechanism.

2. The grapevine covering soil clearing device according to claim 1, further comprising a rack;
the fan, the air outlets reversing device and the soil retaining device are respectively installed on the rack.

3. The grapevine covering soil clearing device according to claim 2, wherein, the two sides of the rack are respectively provided with ground contouring wheels.

4. The grapevine covering soil clearing device according to claim 3, wherein, a connecting rod of the ground contouring wheels is connected to the rack through a height adjustment mechanism.

5. A construction machine, comprising the grapevine covering soil clearing device according to claim 1.

* * * * *